United States Patent [19]
Henry et al.

[11] Patent Number: 5,636,309
[45] Date of Patent: Jun. 3, 1997

[54] ARTICLE COMPRISING A PLANAR OPTICAL WAVEGUIDE MACH-ZEHNDER INTERFEROMETER DEVICE, AND METHOD OF MAKING SAME

[75] Inventors: Charles H. Henry, Skillman; Glenn E. Kohnke; Thomas A. Strasser, both of Chatham, all of N.J.

[73] Assignee: Lucent Technologies Inc., Murray Hill, N.J.

[21] Appl. No.: 604,629

[22] Filed: Feb. 21, 1996

[51] Int. Cl.$^6$ .................................................. G02B 6/10
[52] U.S. Cl. .................................................................. 385/129
[58] Field of Search .................................... 385/27, 9, 31, 385/39, 129–132, 147

[56] References Cited

U.S. PATENT DOCUMENTS

| | | | |
|---|---|---|---|
| 4,900,119 | 2/1990 | Hill et al. | 385/31 |
| 5,195,161 | 3/1993 | Adar et al. | 385/129 |
| 5,276,743 | 1/1994 | Penner et al. | 385/145 X |
| 5,459,801 | 10/1995 | Snitzer | 385/30 |

OTHER PUBLICATIONS

"An All–Fiber Dense–Wavelength–Division Multiplexer/Demultiplexer Using Photoimprinted Bragg Gratings", by F. Bilodeau et al., *IEEE Photonics Technology Letters*, vol. 7, No. 4, Apr. 1995, pp. 388–390.

"Laser–Trimmed Four–Port Bandpass Filter Fabricated in Single–Mode Photosensitive Ge–Doped Planar Waveguide", by R. Kashyap et al., *IEEE Photonics Technology Letters*, vol. 5, No. 2, Feb. 1993, pp. 191–194.

"Four–Channel Wavelength Division Multiplexers and Bandpass Filters Based on Elliptical Bragg Reflectors", by C. H. Henry et al., *Journal of Lightwave Technology*, vol. 8, No. 5, May 1990, pp. 748–755.

"Glass Waveguides on Silicon for Hybrid Optical Packaging", by C. H. Henry, *Journal of Lightwave Technology*, vol. 7, No. 10, Oct. 1989, pp. 1530–1539.

*Primary Examiner*—Akm E. Ullah
*Attorney, Agent, or Firm*—Eugen E. Pacher

[57] ABSTRACT

The disclosed Mach-Zehnder (MZ)-type devices are planar waveguide devices, with interferometer arms of essentially equal length, with a maximum spacing between the arms (e.g., between the waveguide core centers) selected to make possible simultaneous exposure of both arms to refractive index-altering radiation. Exemplarily the maximum spacing is in the range 20–100 μm. The simultaneous exposure of both waveguides makes it possible to form gratings of essential equal strength, such that typically no individual trimming is required. The resulting devices (typically add-drop filters) are substantially less sensitive to environmental changes (e.g., temperature gradients, mechanical vibrations) than prior art fiber-based devices, and are advantageously used in, for instance, WDM optical communication systems.

10 Claims, 3 Drawing Sheets

ARTICLE COMPRISING A PLANAR OPTICAL WAVEGUIDE MACH-ZEHNDER INTERFEROMETER DEVICE, AND METHOD OF MAKING SAME

FIELD OF THE INVENTION

This invention pertains to planar optical waveguide devices, to articles and systems (collectively "articles") that comprise such devices, and to methods of making such devices. Exemplarily, the devices are Mach-Zehnder (MZ) -type add-drop filters.

BACKGROUND OF THE INVENTION

Mach-Zhnder (MZ)-type add-drop filters are known (see, for instance, F. Bilodeau et al., *IEEE Photonics Technology Letters*, Vol. 7(4), p. 388, April 1995), and are expected to find use, inter alia, in dense wavelength-division-multiplexed (WDM) optical communication systems. Such systems will typiclly require the ability to passively multi-plex and de-multiplex channels at the link ends and, at least in some architectures, to add and/or drop channels at selected points on the link. These abilities can be provided by the above referred-to MZ-type devices, specifically, by such devices that comprise refractive index-gratings in both arms of an equal arm MZ-type waveguide interferometer. See U.S. Pat. No. 5,459,801 for further embodiments of add-drop filters.

Such devices, in order to provide acceptable performance, have to meet exacting requirements on, for instance, equality of arm lengths and equality of grating strengths. Furthermore, for obvious reasons, these exacting requirements will typically have to be met over a considerable range of environmental conditions, e.g., for temperatures within some defined range, and in the presence of temperature gradients, and to be substantially maintained in the presence of mechanical vibrations and other disturbances.

To date it has not been possible to meet the requirement without a "trimming" step after grating formation. See, for instance, F. Bilodeau et al. (op. cit.), which discloses an all-fiber MZ-type interferometer with photo-induced Bragg gratings, with additional length (2–3 mm) provided to do UV trimming. The Bragg gratings were formed simultaneously using a KrF excimer laser and a phase mask. Such lasers are known to typically have an output beam of high power and large cross-section but relatively low spatial and temporal coherence.

As those skilled in the art will appreciate, it is at best difficult to dispose fibers side-by-side such that the distance between the fiber cores is less than about 120 μm. Furthermore, it is substantially impossible to attain equal (i.e., to within about 0.01 λ, where λ is the operating wavelength of the device) arm lengths in a fiber MZ-type interferometer. Thus the manufacture of a fiber-based MZ-type add-drop filter would substantially always require a trimming operation, even if the two Bragg gratings were identical. Trimming, however, is highly disadvantageous, since it requires inspection of each device, and individualized exposure to UV radiation of the devices. It clearly would be highly advantageous if individualized trimming could be substantially eliminated. This however does not appear to be possible in fiber MZ-type interferometers. Furthermore, fiber-based interferometer-type devices typically are highly susceptible to mechanical disturbances, typically involving changes in polarization properties.

R. Kashyap et al., *IEEE Photonics Technology Letters*, Vol. 5(2), p. 191 (February 1993), disclose a MZ-type interferometer fabricated in Ge-doped planar silica. Planar waveguide MZ-type interferometers can be relatively easily manufactured with essentially equal arm lengths, due to the close dimensional control obtainable with standard photolithography and etching techniques. Nevertheless, R. Kashyap et al. (op. cit.) found imbalance in the arms that had to be compensated by trimming. See also U.S. Pat. No. 4,900,119, which discloses optical fiber devices, including a fiber MZ device, and the previously cited '801 patent, which discloses devices with refractive index gratings written directly into a coupler region.

In view of the importance of MZ-type interferometer devices, it would be highly desirable to have available such devices that can exhibit relatively stable performance even in the presence of some thermal and mechanical disturbances, and that generally can be manufactured without a trimming step, and also to have available a method of making such devices. This application discloses such devices and such a method.

SUMMARY OF THE INVENTION

In a broad aspect the invention is embodied in an article (e.g., an optical fiber communication system) that comprises an improved planar MZ-type interferometer device. More specifically, the device comprises two planar optical waveguides, with each of said waveguides comprising a core and a cladding. Each of the waveguides comprises an interferometer arm that extends between two coupling regions. In the coupling regions the cores of the respective waveguides are disposed relatively close to each other to facilitate evanescent field coupling. Between the coupling regions the waveguides are disposed (typically parallel over at least a substantial portion of their length) such that essentially no evanescent field coupling between the waveguides occurs. Each of the interferometer arms comprises a refractive index Bragg grating, and the two interferometer arms are of essentially equal length.

Significantly, the interferometer arms are disposed such that the maximum spacing between the arms is small enough to enable simultaneous formation of said refractive index Bragg gratings by simultaneous exposure of both cores to refractive index-changing radiation (typically UV radiation). The maximum distance between the cores (measured center to center) will typically be in the range 20–100 μm, with the range depending, inter alia, on core size, core-cladding refractive index difference, and wavelength. The lower limit is generally set by the onset of evanescent field coupling between the waveguides, whereas the upper limit is generally determined by considerations of exposure time, quality of the exposure beam, and the generally increasing difficulty of simultaneous formation of two essentially equal-strength gratings with increasing core-to-core distance. Thus, it will in general be desirable to select a relatively small distance between the cores.

In a further aspect the invention is embodied in a method of making an article that comprises a MZ-type interferometer device.

The method comprises providing two planar optical waveguides, with each of the waveguides comprising a core and a cladding. The waveguides are disposed such that they form two coupling regions, with each waveguide comprising a portion (herein designated interferometer arm), that extends between the two coupling regions. The interferometer arms are of essentially equal length, and are spaced apart, with the maximum spacing between the arms (that is to say, the maximum spacing between the core centers)

selected to enable simultaneous exposure of both arms to refractive index-changing radiation (typically UV). The method also comprises forming in each of said interferometer arms a refractive index Bragg grating. Forming said Bragg gratings comprises simultaneously exposing a portion of each of said interferometer arms to the refractive index-changing radiation such that essentially identical refractive index Bragg gratings are formed simultaneously.

By a "planar" waveguide we mean herein an optical waveguide, disposed on a substrate (e.g., a major surface of a Si body), that comprises a core and a cladding and is adapted for confining radiation of a predetermined wavelength in the direction normal to the substrate as well as in a direction parallel to the substrate.

DETAILED DESCRIPTION

Figure 1:
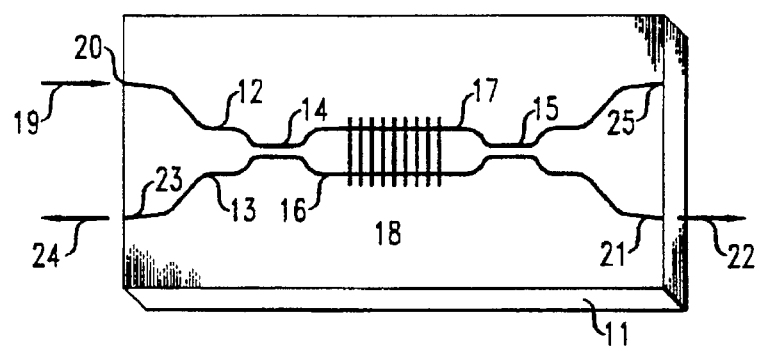
FIG. 1 schematically depicts an exemplary MZ-type interferometer device according to the invention.

FIG. 1 schematically depicts an exemplary MZ-type interferometer device according to the invention. Specifically, it depicts an add-drop filter 10 on a substrate 11. The filter is a 4-terminal device comprising two (typically substantially identical) planar waveguides 12 and 13. Such waveguides are known, and do not require detailed discussion. See, for instance, C. H. Henry et al., *J. of Lightwave Technology*, Vol. 7, p. 1530 (1989). The waveguides are disposed such that two coupling regions (14, 15) are formed. Such couplers are conventional and also do not require detailed discussion. The lengths (16, 17) of waveguides between the couplers are referred to as the interferometer arms. The interferometer arms are spaced apart sufficiently far such that coupling between the arms is negligible, and sufficiently close such that simultaneous formation of two Bragg gratings of essentially equal strength is facilitated. Typically the cores of the two waveguides are spaced at least 20 μm apart.

As those skilled in the art will appreciate, it is required that the two interferometer arms are of essentially identical length, typically within about 0.01 λ. This requirement is substantially impossible to meet in optical fiber MZ-type interferometer devices, but can be met relatively easily in the corresponding planar waveguide devices, with the aid of conventional photolithography techniques.

Each interferometer arm also comprises a refractive index Bragg grating, with the gratings having essentially equal strength in both arms. This is accomplished by simultaneously exposing both arms to refractive index-altering (typically UV) radiation. Typically the waveguides are exposed through a single phase mask that facilitates the selective simultaneous exposure of both cores without relative motion between waveguides and mask. Using this technique, and exercising care to appropriately condition the UV beam and align the mask, it is possible to form essentially identical gratings, such that the device can be operated without prior art trimming.

Exemplarily, a multiplicity of WDM signal channels 19 are provided to (input) port 20. Wavelengths that are not resonant with grating 18 propagate through the grating to port 21 and are provided for, e.g., further demultiplexing. These wavelengths are indicated by arrow 22. On the other hand, a wavelength (or wavelengths) that is resonant with the grating is reflected thereby and exits through port 23, as indicated by arrow 24.

To implement the ADD function, the signal to be added is provided to port 25, and is added to the signal stream 22.

Ideally no signal radiation leaves device 10 through ports 25 and/or 20. Practically, however, the above-described ideal add-drop filter characteristics can only be achieved approximately. Significant causes for imperfect operation are imperfect 3 dB couplers (14, 15), nonidentical gratings in the two interferometer arms, and unequal path lengths in the interferometer arms. The first and last of these can be substantially eliminated in planar waveguide devices through appropriate design and processing. The second source of filter imperfection can be substantially reduced through simultaneous grating exposure, provided the grating position is the same in each interferometer arm. A position difference could arise even in the case of simultaneous exposure if either the grating lines (i.e., the phase mask) or a noncircular exposure beam were tilted with respect to the waveguide axes. These errors can be minimized through careful alignment, as those skilled in the art will recognize. Devices according to the invention not only can typically be fabricated without an individual trimming step but also are relatively insensitive to environmental disturbances such as temperature variations and mechanical vibrations (including substantial insensitivity of the polarization properties to mechanical vibrations), due to the close spacing of the interferometer arms on a common substrate.

By way of example, MZ-type interferometer devices were fabricated in $P_2O_5$-doped $SiO_2$ planar (channel) waveguides on Si substrates, substantially as described in C. H. Henry et al., (op. cit.), incorporated herein by reference. The 5×5 μm² waveguide cores were buried 15 μm below the sample surface, and the relative core/cladding index difference Δ was 0.6%. The arms of the interferometer were 0.5 cm long and the cores were separated laterally by 30 μm. This small separation facilitated a single grating exposure to simultaneously write gratings of essentially equal strength in both arms simultaneously.

In order to enhance the photosensitivity of the $P_2O_5$-doped core, the waveguides were loaded with several mole % of $D_2$ in known manner. The gratings were exposed with a 193-nm ArF excimer laser operating at 30 Hz. A 20-cm focal-length cylindrical lens and slit were placed about 18 cm from the waveguides in the beam path. The lens focused the beam to 0.2 cm width measured perpendicular to the waveguide axes. Diffraction of the beam from the slit resulted in a smooth, Gaussian-like intensity profile with a width of about 0.2 cm measured parallel to the waveguide axes. The resulting fluence per pulse was approximately 100 mJ/cm². Gratings were written by physically contacting a fused-quartz, surface-relief phase mask to the sample surface and exposing the sample for several minutes. Such masks are known and do not require further description.

Figure 2:
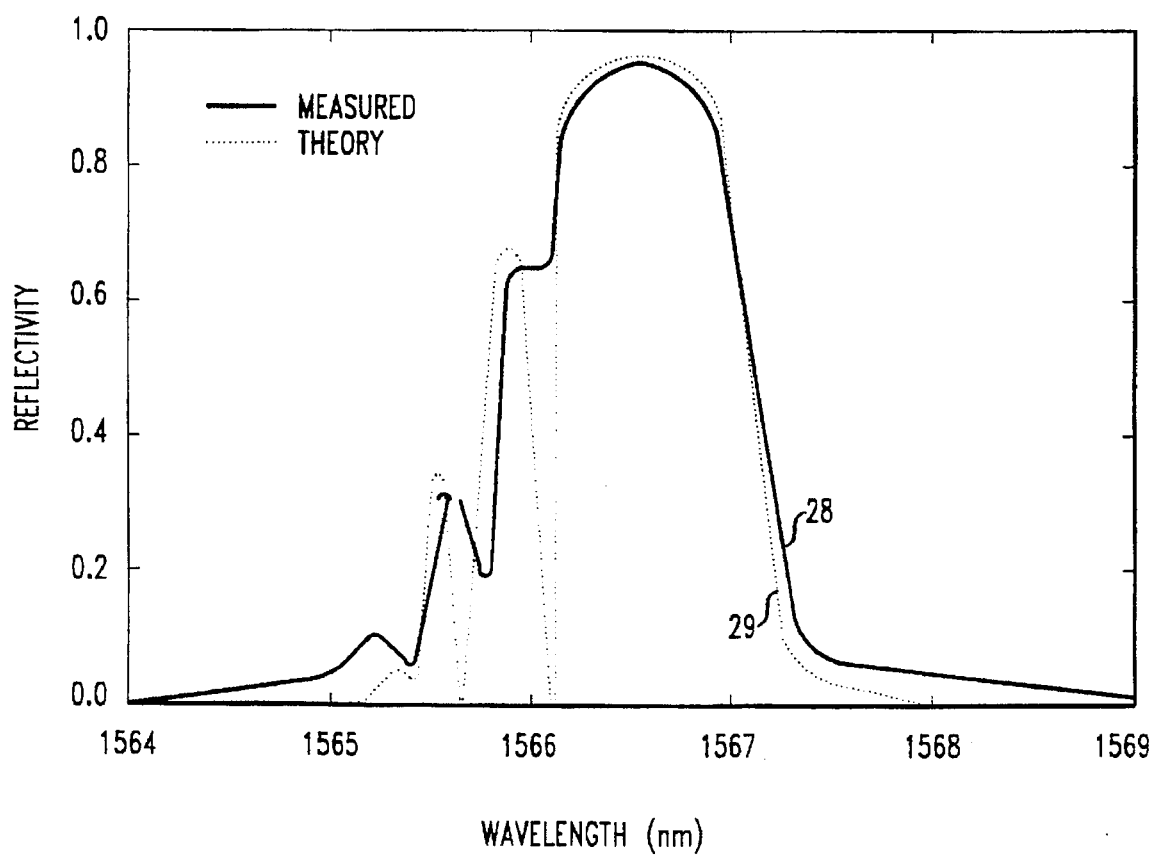
FIG. 2 shows exemplary measured and computed curves of reflectivity vs. wavelength for an exemplary device according to the invention.

FIG. 2 shows the measured reflectivity spectrum 28 of an exemplary device according to the invention, as well as the computed spectrum 29. For the computed spectrum we assumed a Gaussian profile of the period-averaged UV-induced index change. The fit parameters include a Gaussian FWHM (full width at half maximum) of 0.18 cm, a peak period-averaged index change of $1.3 \times 10^{-3}$, and a modulation of 66%. The disagreement between the curves in FIG. 4 occurs largely because the experimental grating profile was not actually Gaussian, and because the measurement resolution was only 0.1 nm. The sidelobes on the short wavelength side of the spectrum result from Fabry-Perot effects associated with wavelengths that are resonant with the tails of the grating but not the center of the grating. The grating exposure was halted before the maximum reflectivity exceeded 99%. Higher reflectivity could be obtained, for instance, with longer gratings.

After completion of the grating exposure, the waveguides were annealed for 24–48 hours at 120° C., in order to enhance long term grating stability and outdiffusion of residual $D_2$. Such annealing is optional.

Figure 3A:
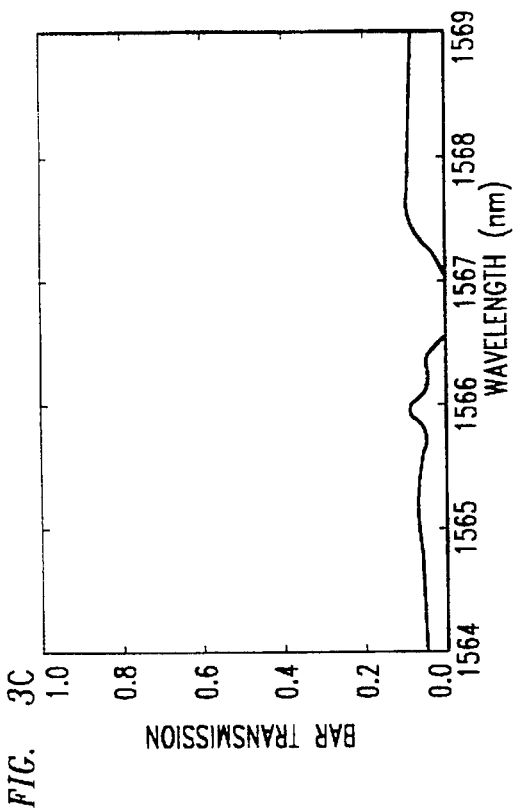
FIGS. 3a–d show measured reflection and transmission spectra at the four ports of an exemplary add-drop filter according to the invention.
Figure 3B:
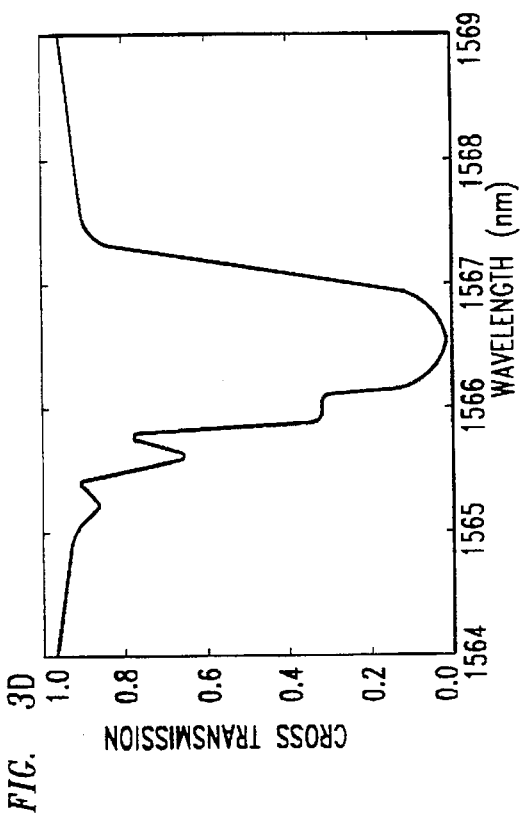
Figure 3C:
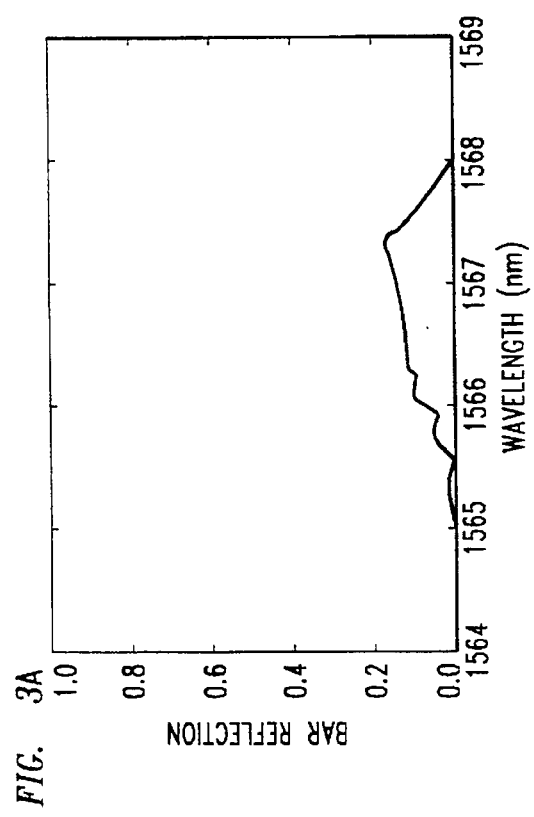
Figure 3D:
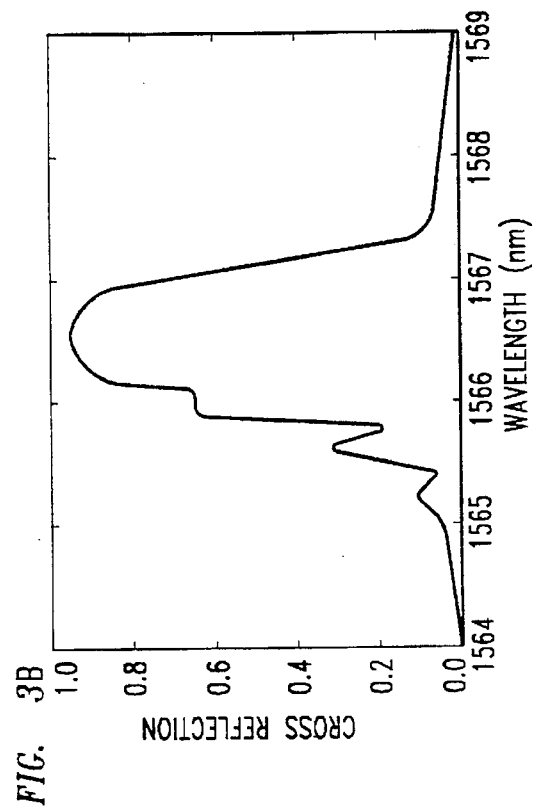

Subsequently we characterized thus produced filters in conventional manner. Measurements were made by butt-coupling fiber ribbon connectors to the waveguides, and using a broad-band edge emitting light emitting diode and an optical spectrum analyzer. Bar reflection was measured using a 3-dB fiber coupler between the source and the device. By measuring the power at all ports of the add drop filter and the fiber coupler, the effects of butt-coupling efficiencies and reflections could be removed from the measured spectra, thus isolating the spectral characteristics of the add-drop filter itself. FIGS. 3a–3d show exemplary results of such measurements, with FIG. 3a showing the reflection spectrum at port 20 of FIG. 1 (also referred-to as $R_-$), FIG. 3b showing the reflection spectrum at port 23 (also referred-to as $R_x$), FIG. 3c showing the transmission spectrum at port 25 (also referred-to as $T_-$), and FIG. 3d showing the transmission spectrum at port 21 (also referred-to as $T_x$).

Those skilled in the art will recognize that the results of FIGS. 3a–d indicate that the gratings were essentially of equal strength, but that the 3 dB couplers were imperfect. The coupler quality could readily be improved by increased care in design and fabrication, and does not constitute a fundamental limitation of devices according to the invention.

Some devices according to the invention may exhibit some birefringence. If desired, this birefringence can be eliminated by UV-induced compaction of silica, substantially as disclosed in co-assigned U.S. patent application Ser. No. 08/396,023.

MZ-type interferometer devices according to the invention optionally can be combined in a variety of ways. Exemplarily, improved device performance can be attained by double filtering (combining two or more interferometer devices), substantially as disclosed by C. H. Henry et al., *J. of Lightwave Technology*, Vol. 8, p. 748 May (1990). Furthermore, interferometer devices can be connected in series to add or drop two or more predetermined channels.

The refractive index gratings can be produced by simultaneous exposure to any suitable index-altering radiation, provided the beam quality is sufficient to result in gratings having essentially equal strength. For instance, we have formed gratings by exposure to 210 nm radiation obtained by frequency doubling the output of a 420 nm dye laser.

Figure 4:
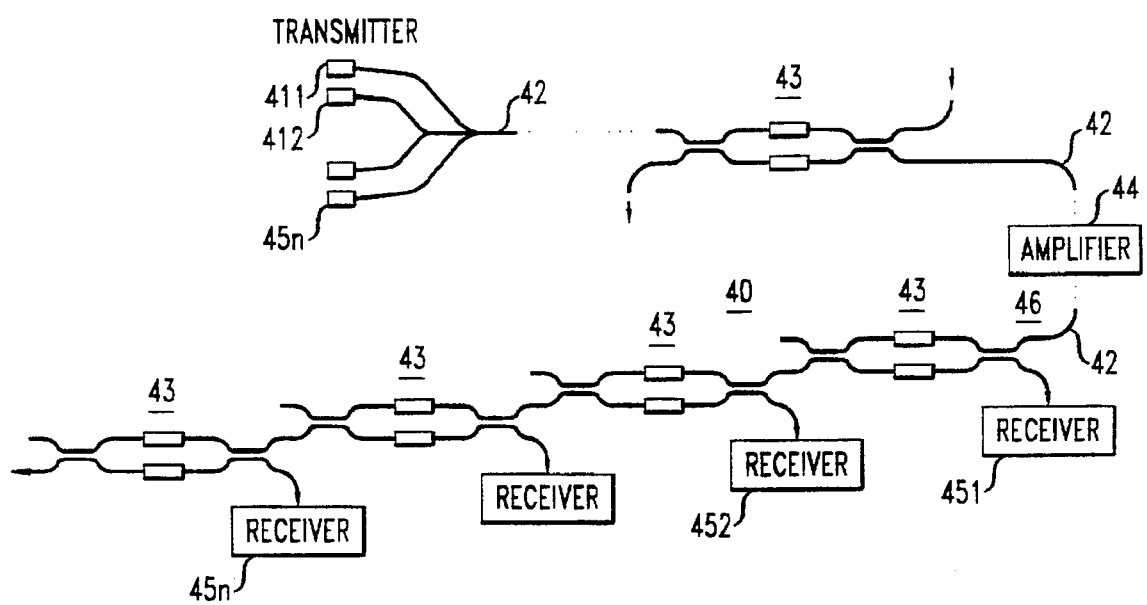
FIG. 4 schematically shows an article according to the invention, namely, a WDM optical waveguide communication system comprising add-drop filters according to the invention.

FIG. 4 schematically shows an exemplary article according to the invention, namely, a WDM optical waveguide communication system 40 that comprises add-drop filters according to the invention. The output of a multiplicity of transmitters (411-41n) is multiplexed onto transmission fiber 42 and propagates towards (optional) intermediate add-drop filter 43. Exemplarily, transmitter 411 has output of wavelength $\lambda_1$, 412 has output of wavelength $\lambda_2 \neq \lambda_1$, etc. At add-drop filter 43 a predetermined signal (e.g., of wavelength $\lambda_2$) can be extracted and possibly a new signal of the same wavelength can be added. The signal stream can be amplified (e.g., by means of optional optical fiber amplifier 44) and, upon arrival at terminus 46, is demultiplexed by means of add-drop filters 43. The demultiplexed signals are then provided to respective receivers 451-45 n (possibly 45n+1). It will be understood that at least one (preferably all) add-drop filter 43 is a MZ-device according to the invention. A variety of conventionally used components (e.g., isolators, terminations) are not shown.

Figure 5:
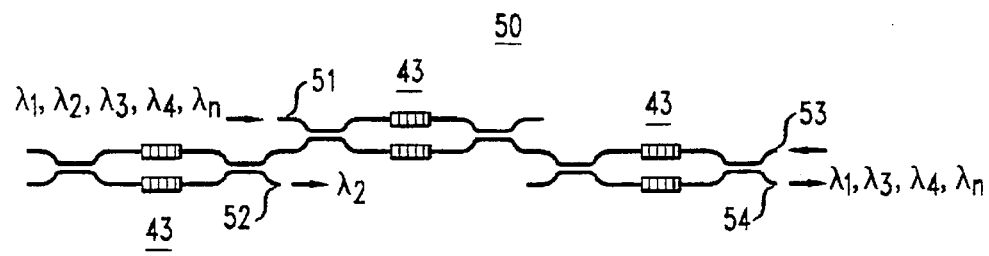
FIG. 5 schematically depicts an exemplary double filtering add-drop arrangement.

FIG. 5 schematically depicts a double-filtering add drop arrangement 50, wherein desirably all three add-drop filters 43 are MZ-type devices according to the invention. Exemplary, the input into port 51 is a WDM signal stream $(\lambda_1, \lambda_2, \lambda_3, \ldots \lambda_n)$, the output at port 52 exemplarily is the signal of wavelength $\lambda_2$, and the output at port 54 exemplarily is the remaining wavelengths $(\lambda_1, \lambda_3, \ldots \lambda_n)$. Optionally, a signal can be added at port 53. As those skilled in the art will recognize, double filtering can substantially reduce the strength of side lobes of the dropped signal, and substantially improve the isolation between, e.g., the dropped signal and the continuing signals.

The invention claimed is:

1. An article comprising a Mach-Zehnder-type interferometer device comprising two planar optical waveguides, each of said waveguides comprising a core and a cladding, each core having a center, each of the planar optical waveguides comprising an interferometer arm extending between two coupling regions, with a refractive index Bragg grating in each interferometer arm, and with a maximum spacing between the respective core centers in said interferometer arms between the two coupling regions, said two interferometer arms being of essentially identical lengths,

CHARACTERIZED IN THAT said maximum spacing is in the range 20–100 µm and is selected to enable simultaneous formation of said refractive index Bragg gratings by simultaneous exposure of both cores to refractive index-changing radiation.

2. Article according to claim 1, wherein said planar optical waveguides are disposed on a major surface of a silicon body.

3. Article according to claim 1, wherein said interferometer arms are parallel to each other over at least a substantial portion of the length of the interferometer arms.

4. Article according to claim 1, wherein the Mach-Zehnder-type interferometer device is an add-drop filter.

5. Article according to claim 4, wherein said article is a wavelength division multiplex optical waveguide communication system comprising a multiplicity of transmitters, a multiplicity of receivers, and optical waveguide transmission means that signal-transmissively connect said transmitters and said receivers, said optical waveguide transmission means including said add-drop filter.

6. Article according to claim 5, wherein said optical waveguide transmission means further comprise optical fiber signal-transmissively coupled to at least one of the waveguides of the add-drop filter.

7. Article according to claim 4, wherein said add-drop filter is a double filtering add-drop filter.

8. Method of making an article that comprises a Mach-Zehnder-type interferometer device, the method comprises
   a) providing two planar optical waveguides, with each of said waveguides comprising a core and a cladding, said waveguides disposed such that the waveguides form two coupling regions, with each waveguide comprising an interferometer arm extending between the two coupling regions, said interferometer arms being of essentially equal length; and b) forming in each interferometer arm a refractive index Bragg grating having a strength;

CHARACTERIZED IN THAT step b) comprises simultaneously exposing a portion of each of said interferometer arms to refractive index-changing radiation such that essentially equal strength refractive index Bragg gratings are formed simultaneously, and the method does not comprise a step of exposing, after Bragg grating formation, an interferometer arm to the refractive index-changing radiation to correct an imbalance between the interferometer arms.

9. Method of claim 8, further comprising introducing, prior to exposing said interferometer arms to said refractive index-changing radiation, said interferometer arms to deuterium.

10. Method of claim 9, further comprising heating, subsequent to said exposing, the Mach-Zehnder type interferometer device such that at least some deuterium is removed from the interferometer arms.

* * * * *